US007693055B2

(12) United States Patent
Vasseur et al.

(10) Patent No.: US 7,693,055 B2
(45) Date of Patent: Apr. 6, 2010

(54) OPTIMIZATION OF DISTRIBUTED TUNNEL REROUTING IN A COMPUTER NETWORK WITH INTERMEDIATE NODE FEEDBACK (75) Inventors: Jean-Philippe Vasseur, Dunstable, MA (US); Francois Le Faucheur, Valbonne (FR); Anna Charny, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 621 days.

(21) Appl. No.: 11/676,614

(22) Filed: Feb. 20, 2007

(65) Prior Publication Data
US 2008/0151933 A1 Jun. 26, 2008

Related U.S. Application Data (60) Provisional application No. 60/871,515, filed on Dec. 22, 2006.

(51) Int. Cl.
*H04L 12/26* (2006.01)
(52) U.S. Cl. ........................................ 370/230; 370/237
(58) Field of Classification Search ......... 370/229–235, 370/237, 243, 248, 254, 255
See application file for complete search history.

(56) References Cited

U.S. PATENT DOCUMENTS

| 6,122,272 | A | 9/2000 | Tomaszewski et al. |
| 6,256,309 | B1 | 7/2001 | Daley et al. |
| 6,370,119 | B1 | 4/2002 | Basso et al. |
| 6,600,724 | B1 | 7/2003 | Cheng |
| 6,628,649 | B1 | 9/2003 | Raj et al. |
| 6,717,920 | B1 | 4/2004 | Cheng |
| 6,751,190 | B1 | 6/2004 | Swallow |
| 6,778,492 | B2 | 8/2004 | Charny et al. |
| 6,978,394 | B1 | 12/2005 | Charney et al. |
| 7,031,262 | B2 | 4/2006 | Vasseur et al. |
| 7,042,834 | B1 | 5/2006 | Savage |
| 7,054,262 | B2 | 5/2006 | Gerstel |
| 7,085,224 | B1 | 8/2006 | Oran |
| 7,333,438 | B1 * | 2/2008 | Rabie et al. ................. 370/242 |
| 2002/0114272 | A1 | 8/2002 | Stewart |
| 2003/0126287 | A1 | 7/2003 | Charny et al. |
| 2003/0147352 | A1 * | 8/2003 | Ishibashi et al. ............ 370/248 |
| 2004/0010617 | A1 * | 1/2004 | Akahane et al. ............. 709/243 |
| 2005/0117512 | A1 | 6/2005 | Vasseur et al. |
| 2005/0281192 | A1 | 12/2005 | Nadeau et al. |
| 2006/0039391 | A1 | 2/2006 | Vasseur et al. |

(Continued)

OTHER PUBLICATIONS

U.S. Appl. No. 60/871,515, filed Dec. 22, 2006, entitled Optimization of Distributed Tunnel Rerouting In A Computer Network, by Vasseur et al., 42 pgs.

(Continued)

*Primary Examiner*—Kwang B Yao
*Assistant Examiner*—Andrew Lai
(74) *Attorney, Agent, or Firm*—Cesari and McKenna, LLP (57) ABSTRACT In one embodiment, a head-end node determines a path for un-reroutable tunnels, and establishes a tunnel having zero bandwidth indicating the corresponding bandwidth desired for the tunnel. Intermediate nodes send feedback regarding a bandwidth scaling factor for the path, and the head-end node resizes each tunnel accordingly.

20 Claims, 8 Drawing Sheets

U.S. PATENT DOCUMENTS

2006/0104199 A1   5/2006   Katukam et al.
2006/0250964 A1   11/2006  Vasseur et al.

OTHER PUBLICATIONS

Awduche, D., Network Working Group Request for Comments 3209, entitled "RSVP-TE: Extensions to RSVP for LSP Tunnels," IETF, Dec. 2001, pp. 1-57.

Smit, H., Network Working Group Request for Comments 3784, entitled "Intermediate-System-to-Intermediate-System (IS-IS) Extensions for Traffic Engineering (TE)," IETF, Jun. 2004, pp. 1-13.

Katz, D. et al, Network Working Group Request for Comments 3630, entitled "Traffic Engineering (TE) Extensions to OSPF Version 2," IETF, Sep. 2003, pp. 1-14.

Braden, R. et al., Network Working Group Request for Comments 2205, entitled "Resource ReSerVation Protocol (RSVP), Version 1 Functional Specification," IETF, Sep. 1997, pgs. 1-105.

Berber, L., Network Working Group Request for Comments 3473, entitled "Generalized Multi-Protocol Label Switching (GMPLS) Signaling Resource ReserVation Protocol—Traffic Engineering (RSVP-TE) Extensions,"IETF, Jan. 2003, pp. 1-40.

* cited by examiner

OPTIMIZATION OF DISTRIBUTED TUNNEL REROUTING IN A COMPUTER NETWORK WITH INTERMEDIATE NODE FEEDBACK

CROSS-REFERENCE TO RELATED APPLICATION

The present application claims the benefit of U.S. Provisional Patent Application Ser. No. 60/871,515, which was filed on Dec. 22, 2006, by Vasseur et al. for OPTIMIZATION OF DISTRIBUTED TUNNEL REROUTING IN A COMPUTER NETWORK and is hereby incorporated by reference.

TECHNICAL FIELD

The present disclosure relates generally to computer networks, and, more particularly, to rerouting of tunnels within computer networks.

BACKGROUND

Path computation for tunnels of a computer network, e.g., label switched paths (LSPs), is generally performed in a distributed manner, where each head-end node of the tunnels computes paths for its tunnels independently from head-end nodes of other tunnels. For example, tunnels in many Multi-Protocol Label Switching (MPLS) Traffic Engineering (TE) networks (e.g., MPLS TE-LSPs) are computed using a distributed constrained shortest path first (CSPF) algorithm. As those skilled in the art will understand, distributed CSPF offers high flexibility/scalability, and is well-equipped to handle frequent topology changes, dynamic traffic demands, and resource availability changes.

One problem associated with distributed path computation is that while it may be highly flexible/scalable, it may be inefficient for optimizing tunnel placement within the network, i.e., due to the lack of path computation coordination among the head-end nodes. In particular, when one or more established tunnels utilize a link that becomes unavailable to those tunnels (e.g., due to failure of the link or preemption of certain tunnels on the link for a higher priority tunnel), each of the head-end nodes corresponding to the affected tunnels generally attempts to reroute the tunnels through the network. The distributed rerouting of the tunnels may cause a burst of signaling within the network to reroute the tunnels, which may lead to signaling failures, as will be understood by those skilled in the art. Also, "preemption cascading," where one tunnel is rerouted and then preempts shortly thereafter a lower priority tunnel, which then preempts a still lower priority tunnel, etc., may occur with distributed rerouting of tunnels. In addition, if many smaller tunnels are rerouted throughout the network, those smaller tunnels may "fragment" the remaining bandwidth of the network, to the extent that even if a large amount of bandwidth is available from a source to a destination, that bandwidth may be fragmented into smaller amounts along multiple paths such that no one (acceptable) path exists upon which a large tunnel may be placed.

Further, when there is a link (or node) failure within a network, the total available bandwidth of the network is reduced. For instance, this may result in some tunnels that had been in place before the link failure not being able to find a path after the failure due to insufficient bandwidth availability of the network. For guaranteed traffic over the tunnels (e.g., voice, video, etc.), the tunnels that are able to find suitable paths may maintain the bandwidth guarantee, while other tunnels that are not able to find such paths are unable to maintain their guarantee.

Due to the distributed nature of path computation for tunnels (e.g., distributed CSPF), it has generally not been possible to coordinate the rerouting (replacement) of tunnels in a computer network such that substantially all tunnels can be placed. In other words, it has generally not been possible to coordinate the timing, placement, and bandwidth reservation (e.g., fair bandwidth allocation) of tunnels using distributed path computation, particularly in the event of a link (or node) becoming unavailable to the tunnels, e.g., due to a failure or preemption on the link.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a head-end node determines a need to reroute one or more of its tunnels, each tunnel having a corresponding bandwidth. The head-end node also determines a set of the one or more tunnels that it is unable to reroute with the corresponding bandwidth(s). Accordingly, the head-end node determines a path for each un-rerouted tunnel of the set that notably has an available bandwidth less than the corresponding bandwidth for that un-rerouted tunnel. For each un-rerouted tunnel, the head-end node then establishes along its determined path a tunnel having zero bandwidth and an indication of the corresponding bandwidth desired for the un-rerouted tunnel. From one or more intermediate nodes along one or more paths of the tunnels, the head-end node may thereafter receive feedback regarding a bandwidth scaling factor for the path based on an available bandwidth of a particular path link (e.g., of the sending intermediate node) and the desired bandwidth for the one or more tunnels traversing the particular path link. Upon receiving the feedback, the head-end node may resize each tunnel with a scaled bandwidth corresponding to the desired bandwidth for each tunnel and a most stringent received bandwidth scaling factor for the path of that tunnel.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

Figure 1:
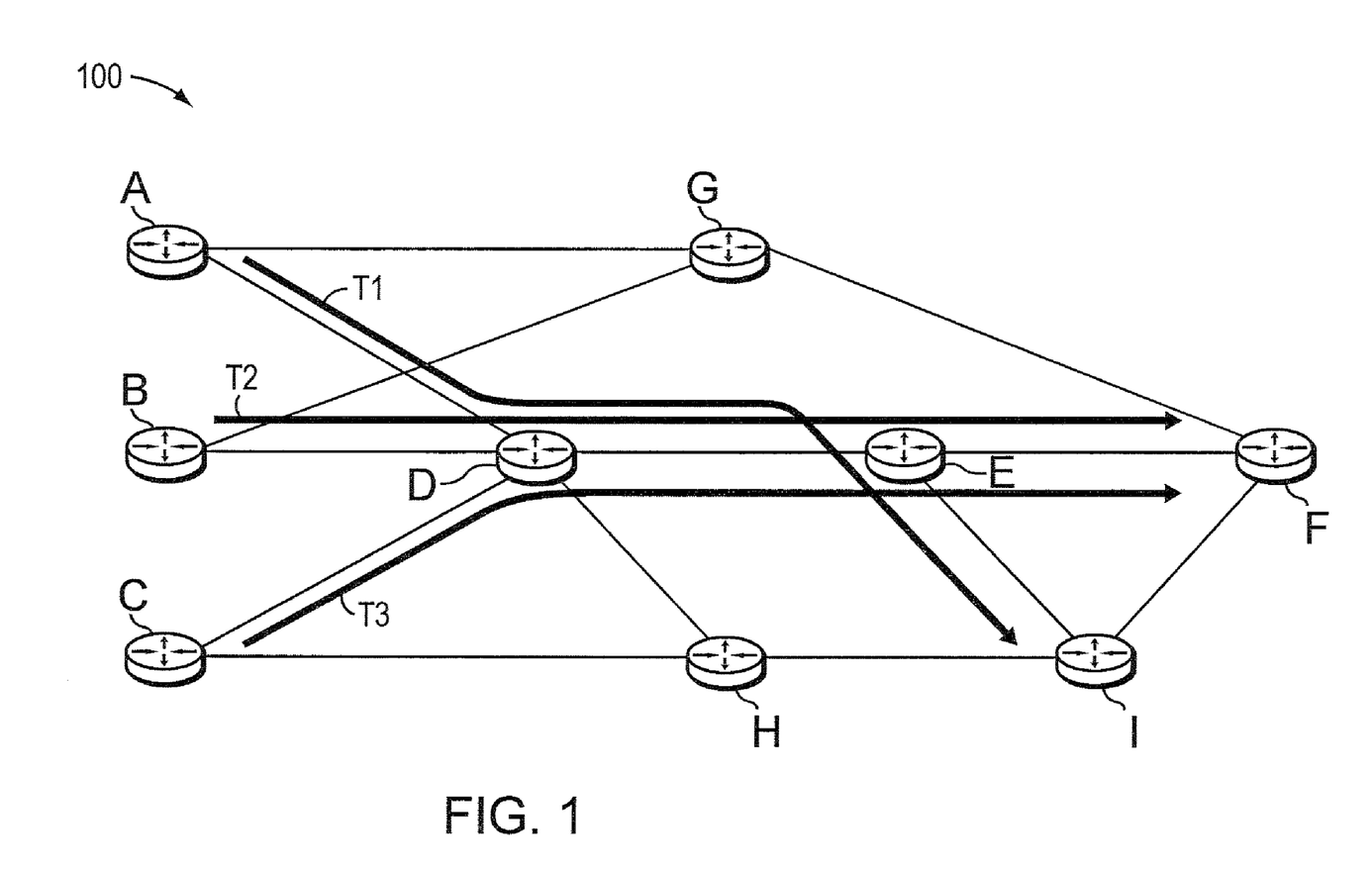
FIG. 1 illustrates an example computer network.

FIG. 1 is a schematic block diagram of an example computer network 100 illustratively comprising nodes (e.g., routers) A-I interconnected by links as shown. Illustratively, various tunnels (not shown) may traverse the links between head-end nodes (e.g., nodes A-C) and tail-end nodes (e.g., nodes F and I), such as through one or more intermediate nodes (e.g., at least nodes D, E, G, and H), as described herein and as will be understood by those skilled in the art. Those skilled in the art will also understand that any number of nodes, routers, links (e.g., with any bandwidth values), etc. may be used in the computer network, and that the view shown herein is for simplicity. Further, those skilled in the art will also understand that while the present invention is described generally, it may apply to customer networks and provider core networks with provider (P) and provider edge (PE) routers, any network configuration within an AS or area/level, or throughout multiple ASes or areas/levels, etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
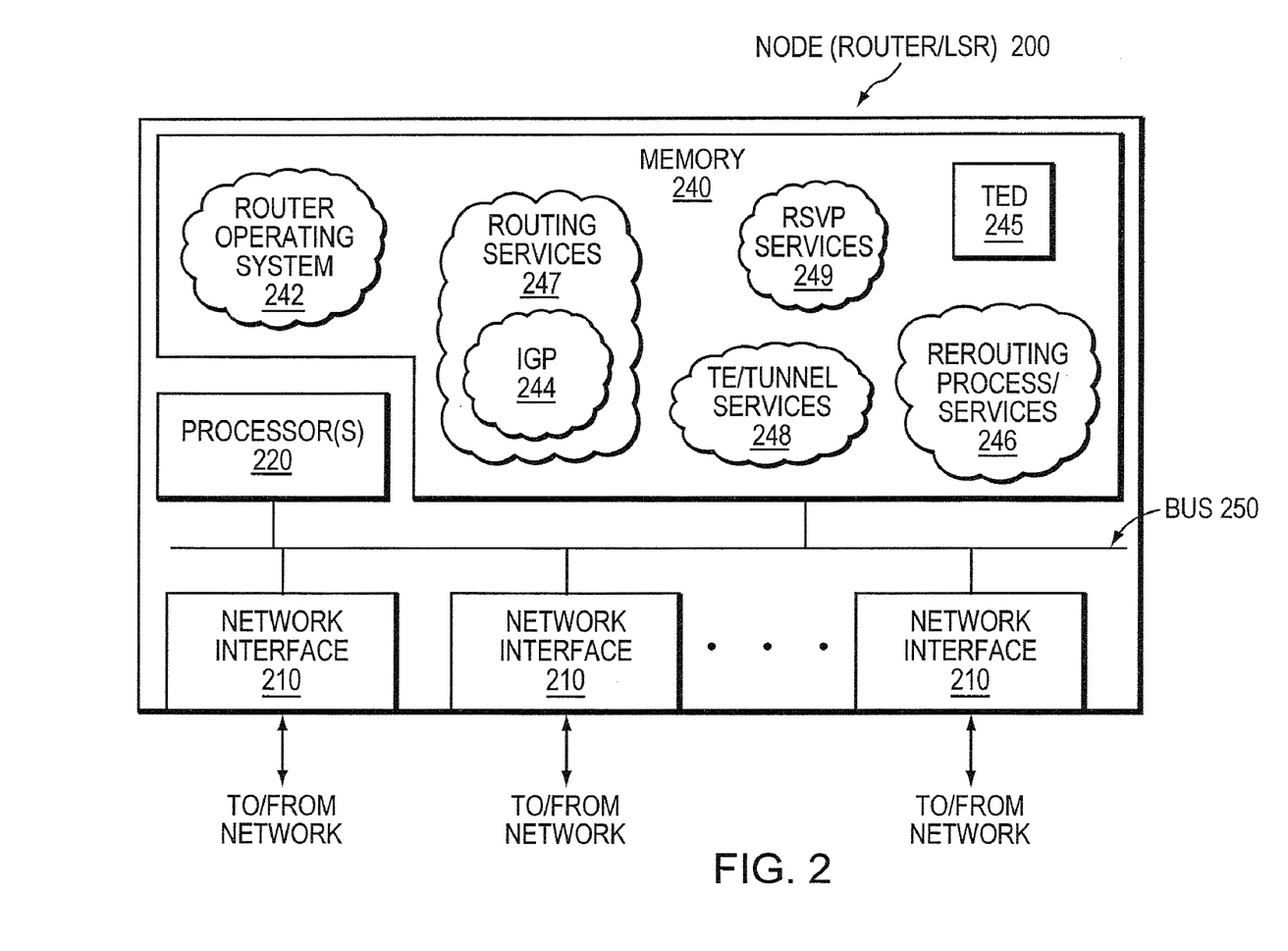
FIG. 2 illustrates an example network device/node.

FIG. 2 is a schematic block diagram of an example node/router 200 that may be advantageously used with one or more embodiments described herein, e.g., as a head-end node or intermediate node (label switched routers, "LSRs"). The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures, such as Traffic Engineering Database (TED) 245. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the router. These software processes and/or services may comprise routing services 247, Interior Gateway Protocol (IGP) services 244, Resource ReSerVation Protocol (RSVP) services 249, Traffic Engineering (TE)/Tunnel services 248, and as described herein, an example rerouting process/service 246. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., Open Shortest Path First, "OSPF," and Intermediate-System-to-Intermediate-System, "IS-IS") as IGP services 244, the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Changes in the network topology within the local domain (network 100) may be communicated among routers 200 within the network 100 using IGP services 244, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
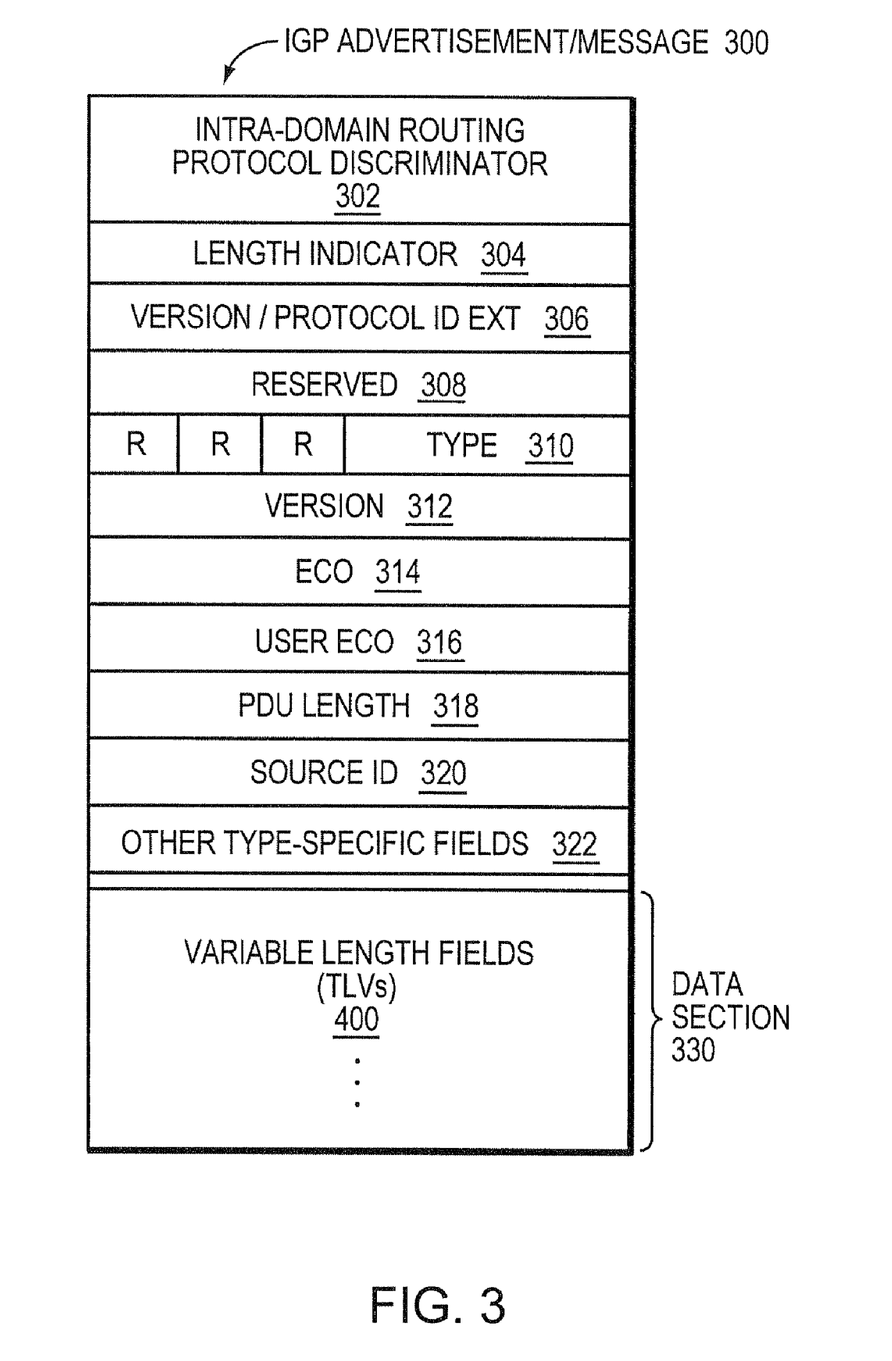
FIG. 3 illustrates an example IGP message.

FIG. 3 illustrates an example IGP advertisement 300 that may be flooded by the routers 200. Illustratively, IGP advertisement 300 is shown as an IS-IS link state packet. Those skilled in the art will understand, however, that other IGP advertisements may be used in accordance with the one or more embodiments described herein, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a link state packet, a "Hello" packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

Figure 4:
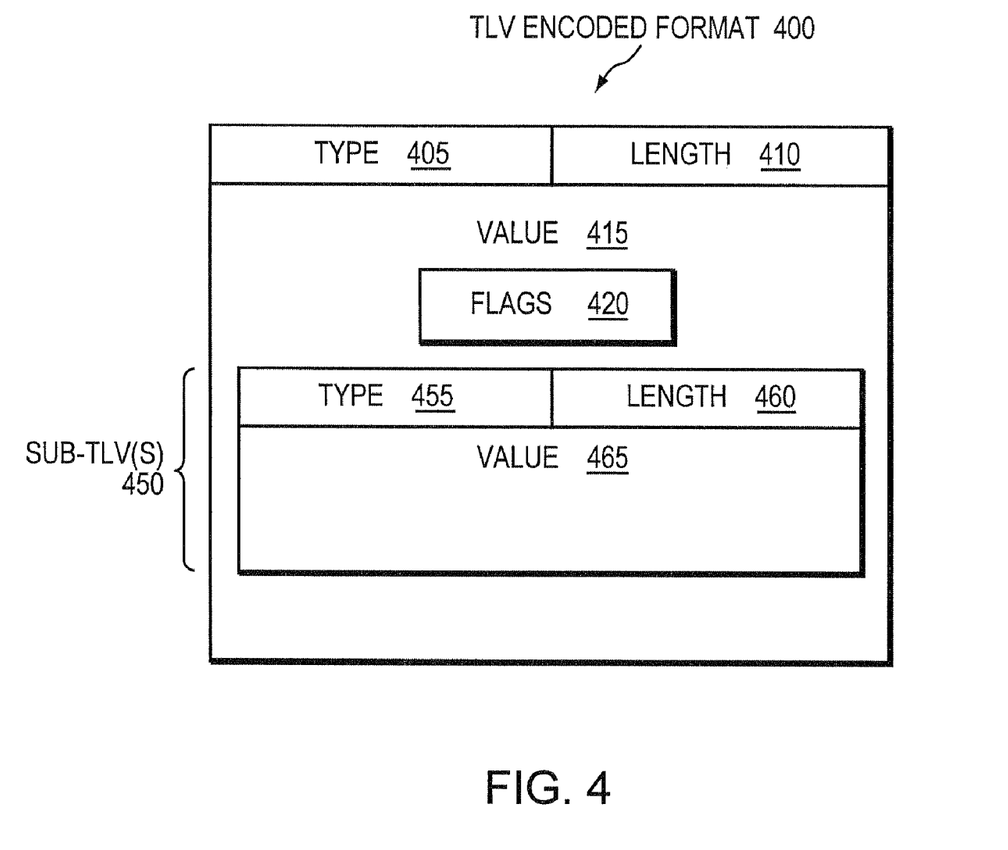
FIG. 4 illustrates an example TLV format.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and one or more novel fields (e.g., sub-TLVs in a Router Capability TLV), described further below. Generally, the received IGP advertisements are stored in a link state database (LSDB) of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein. Notably, for use with OSPF link state advertisements as IGP advertisements 300, TLVs 400 (e.g., in accordance with the embodiments described herein) may be contained within specific types of advertisements (e.g., Router Information advertisements), or with opaque advertisements, as will be understood by those skilled in the art. The use of IS-IS link state packets, therefore, is merely a representative example.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages in accordance with the embodiments described herein. Further, TE services 248 contain computer executable instructions for implementing TE functions in accordance with the embodiments described herein. Examples of Traffic Engineering are described in RFC 3209, RFC 3784, and RFC 3630 as incorporated above, and in RFC 3473, entitled, *Generalized Multi-Protocol Label Switching* (*GMPLS*) *Signaling Resource ReSerVation Protocol-Traffic Engineering* (*RSVP-TE*) *Extensions* dated January 2003, which is hereby incorporated by reference in its entirety. TED 245 may be illustratively resident in memory 240 and used to store TE information provided by the routing protocols, such as IGP, BGP, and/or RSVP (e.g., with TE extensions as described herein). The TED may be illustratively maintained and managed by TE services 248.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

In particular, in accordance with RSVP, to request a data flow (tunnel) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the tunnel. The Path message may contain various information about the data flow including, e.g., traffic characteristics of the data flow. Also in accordance with the RSVP, a receiver establishes the tunnel between the sender and receiver by responding to the sender's Path message with a reservation request (Resv) message. The reservation request message travels upstream hop-by-hop along the flow from the receiver to the sender (i.e., along intermediate nodes). The reservation request message contains information that is used by intermediate nodes along the flow to reserve resources for the data flow between the sender and the receiver, to confirm the attributes of the tunnel, and provide a tunnel label. If an intermediate node in the path between the sender and receiver acquires a Path message or Resv message for a new or established reservation (tunnel) and encounters an error (e.g., insufficient resources, failed network element, etc.), the intermediate node generates and forwards a path or reservation error (PathErr or ResvErr, hereinafter Error) message to the sender or receiver, respectively.

Figure 5:
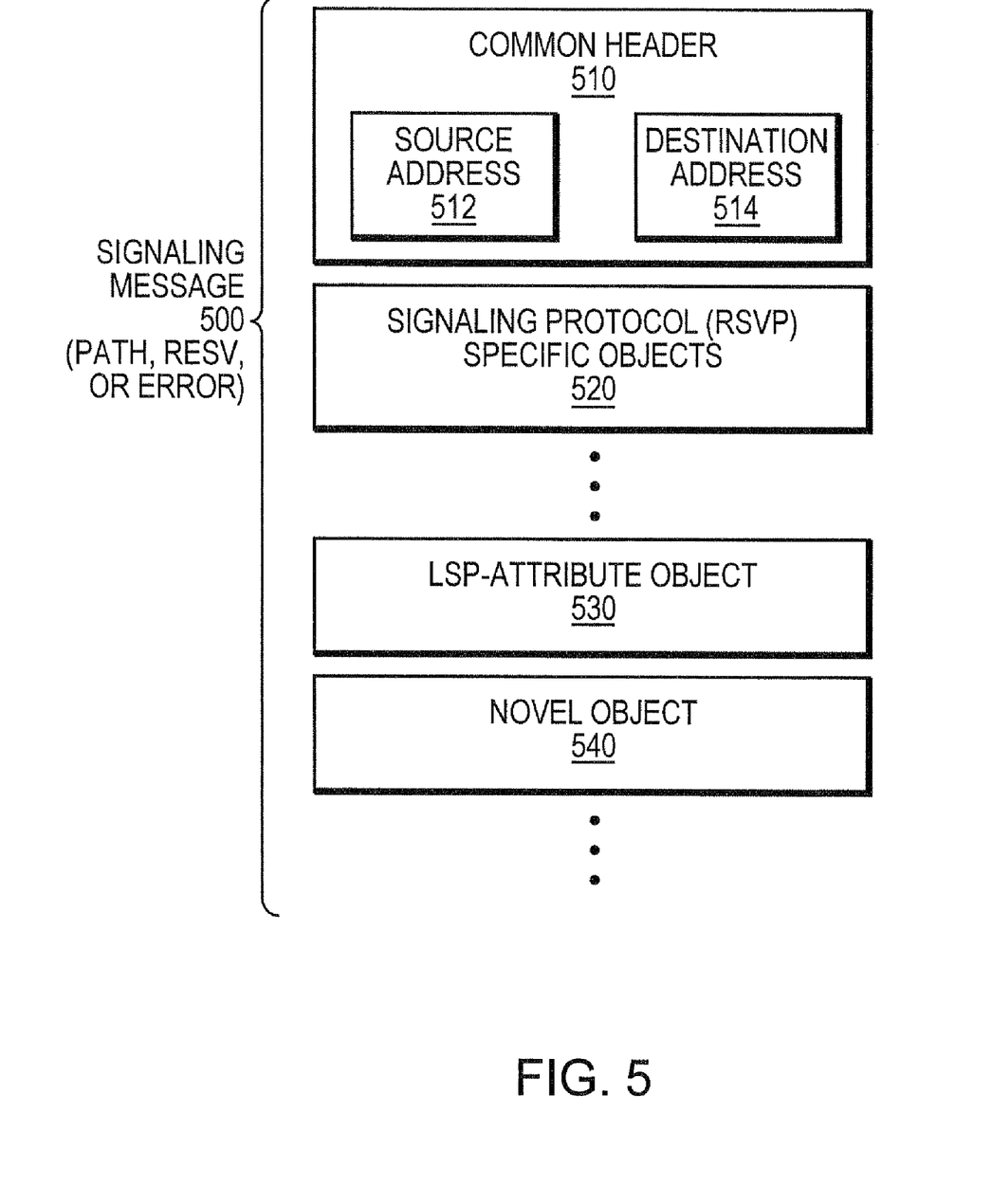
FIG. 5 illustrates an example RSVP message.

FIG. 5 is a schematic block diagram of portions of a signaling message 500 (e.g., RSVP message, such as Path, Resv or Error) that may be advantageously used with the present invention. Message 500 contains, inter alia, a common header 510, one or more signaling protocol specific objects 520, such as an LSP-Attribute object 530, as well as one or more other (e.g., novel) objects 540, described below. The common header 510 may comprise a source address 512 and destination address 514, denoting the origination and requested termination of the message 500. Protocol specific objects 520 contain objects necessary for each type of message 500 (e.g., Path, Resv, Error, etc.). For instance, a Path message may have a sender template object, Tspec object, Previous-hop object, etc. A Resv message, on the other hand, may have specific objects 520 for a label object, session object, filter spec object, etc. Also, Error messages 500 (e.g., PathErr or ResvErr), may also have specific objects 520, such as for defining the type of error, etc. Various flags and/or TLVs 400 may also be contained within the objects 520-540, as will be understood by those skilled in the art.

It should be noted that in accordance with RSVP signaling, the state of the RSVP is refreshed on a timed interval, e.g., every thirty seconds, in which RSVP Path and Resv messages are exchanged. This timed interval is configurable by a system administrator. Moreover, various methods understood by those skilled in the art may be utilized to produce route record objects (RROs) contained in signaling messages for a tunnel.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node (e.g., in a distributed manner, as described herein) or by some other entity operating as a path computation element (PCE) not co-located on the head-end node. Various path computation methodologies are available including CSPF (constrained shortest path first).

Illustratively, with reference again to FIG. 1, head-end nodes A, B, and C have established tunnels T1, T2, and T3, respectively, along paths as shown to tail-end nodes I, F, and F, also respectively. In particular, each tunnel T1-T3 traverses a particular link of network 100, e.g., the link between intermediate nodes D and E ("link D-E").

As noted, distributed CSPF may be used in a network, such that each head-end node of a tunnel computes its own tunnel paths through the network, particularly when rerouting the tunnel due to tunnel preemption and/or failure of a network element (e.g., a node or link). A problem with distributed path computation is that it may be inefficient for optimizing tunnel placement within the network. For example, it has generally not been possible to coordinate the timing, placement, and bandwidth reservation (e.g., reduced yet fair bandwidth allocation) of tunnels using distributed path computation, particularly in the event of a link (or node) becoming unavailable to the tunnels.

Optimization of Distributed Tunnel Rerouting: Head-End Nodes Respond to Intermediate Node Feedback According to embodiments of the disclosure, a head-end node determines a need to reroute one or more of its tunnels, each tunnel having a corresponding bandwidth. The head-end node also determines a set of the one or more tunnels that it is unable to reroute with the corresponding bandwidth(s). Accordingly, the head-end node determines a path for each un-rerouted tunnel of the set that notably has an available bandwidth less than the corresponding bandwidth for that un-rerouted tunnel. For each un-rerouted tunnel, the head-end node then establishes along its determined path a tunnel having zero bandwidth and an indication of the corresponding bandwidth desired for the un-rerouted tunnel. From one or more intermediate nodes along one or more paths of the tunnels, the head-end node may thereafter receive feedback regarding a bandwidth scaling factor for the path based on an available bandwidth of a particular path link (e.g., of the sending intermediate node) and the desired bandwidth for the one or more tunnels traversing the particular path link. Upon receiving the feedback, the head-end node may resize each tunnel with a scaled bandwidth corresponding to the desired bandwidth for each tunnel and a most stringent received bandwidth scaling factor for the path of that tunnel.

In an illustrative embodiment, rerouting process/services 246 contain computer executable instructions executed by each processor 220 to perform functions relating to the novel techniques described herein to optimize distributed rerouting of tunnels in a computer network.

Figure 6A:
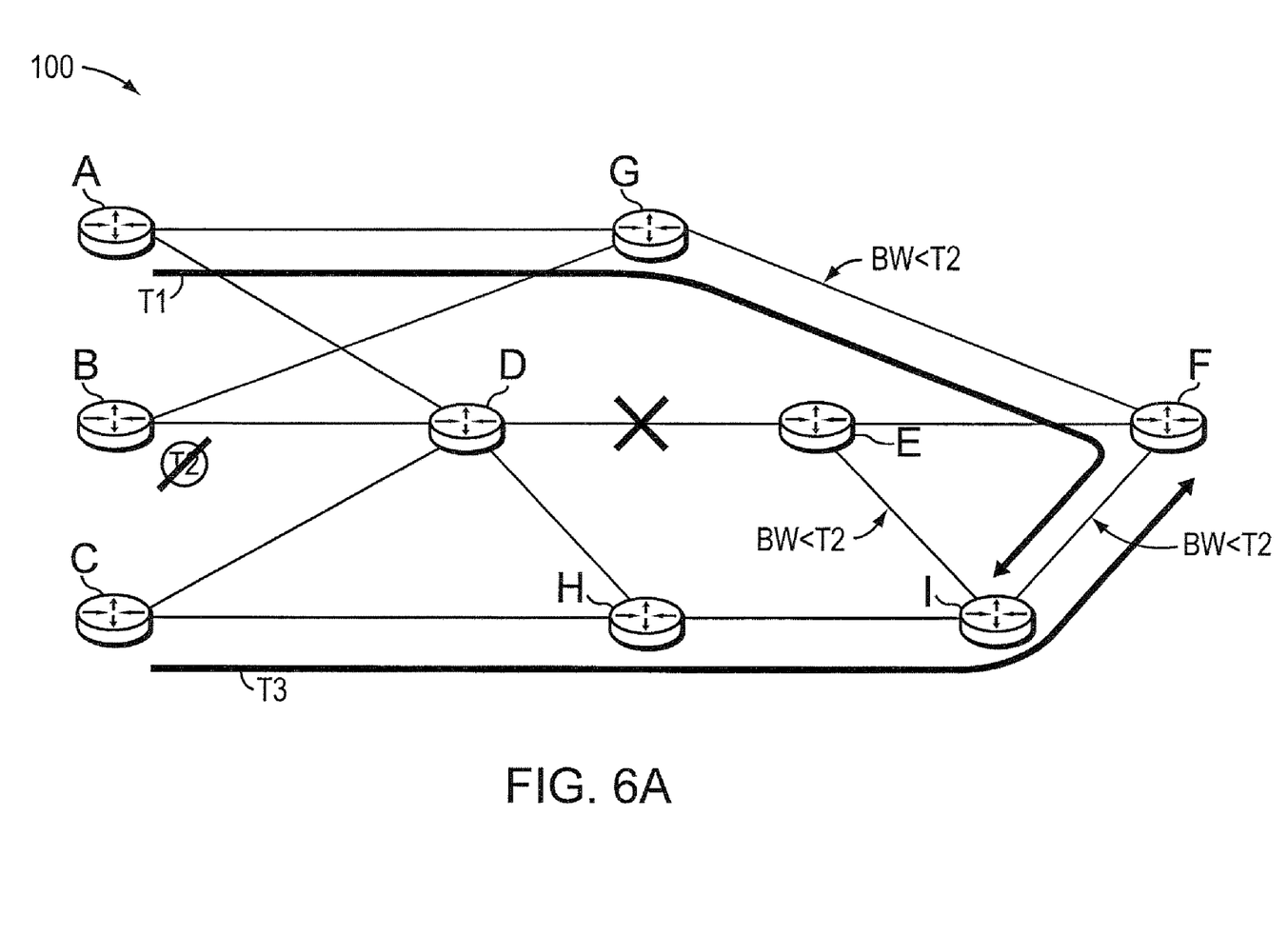
FIGS. 6A-B illustrate an example computer network with optimized distributed tunnel rerouting in accordance with one or more embodiments described herein.

Operationally, the rerouting process/services 246 of a head-end node may learn that it needs to reroute a set of its tunnels based on receiving notification (e.g., from an intermediate node) that a node or link on the path traversed by the set of tunnels has failed, or that a set of the tunnels has been preempted by one or more higher priority tunnels, as will be understood by those skilled in the art. For example, with reference to FIG. 6A, head-end node B may determine that link D-E has failed (shown as the overlaid "X"). In response, the rerouting process 246 of the head-end node may first attempt to reestablish (replace/reroute) the tunnel using conventional path computation, e.g., CSPF, that considers the original constraints of the tunnel, particularly bandwidth. If reestablishment is successful, the process is complete. As shown in FIG. 6A, however, head-end nodes A and C may have rerouted their tunnels T1 and T3 first, thus any remaining links to T2's tail-end node F have bandwidth ("BW") less than what is needed for T2.

Figure 6B:
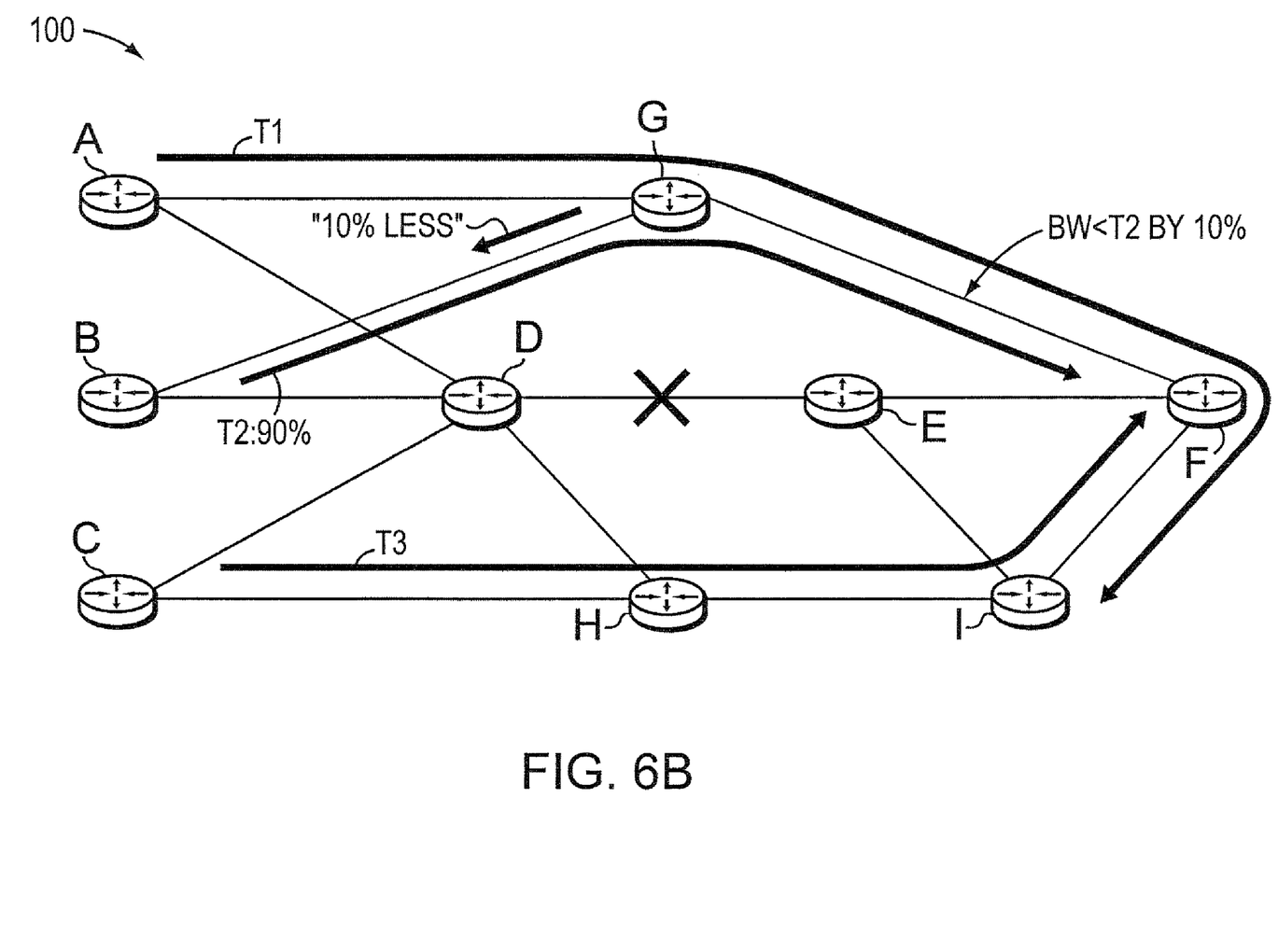

If conventional path computation does not find a path for one or more of the head-end node's tunnels ("un-rerouted tunnels"), the rerouting process of the head-end node may utilize a different path computation technique to locate a path through the network to the destination of the tunnel (e.g., other than CSPF). For example, the path computation may either completely or partially ignore bandwidth availability constraints for these tunnels in order to simply find a best path based on one or more other metrics, e.g., using SPF, or SPF with link metrics set to residual capacity (as will be understood by those skilled in the art), or some other algorithm, such as one used to minimize the maximum overload of any link traversed by these un-rerouted tunnels, etc. Note that whatever paths are computed for the un-rerouted tunnels, the paths will not have sufficient bandwidth for the tunnels' desired bandwidth (e.g., the original tunnel bandwidth that needs to be rerouted), since should a path exist with sufficient bandwidth, conventional path computation (e.g., CSPF) would have discovered it. Illustratively, FIG. 6B shows an example path computation result that may be computed by head-end node B. Notably, while tunnel T2 may now have a path to its tail-end node, the path still does not meet the bandwidth constraint of T2.

Once paths are computed for the un-rerouted tunnels (e.g., T2), the rerouting process of the head-end node (node B) signals the un-rerouted tunnels over the computed paths with zero bandwidth and an indication of the desired bandwidth for each tunnel. For instance, a new flag in the LSP-ATTRIBUTE field 530 carried in the RSVP Path-message 500 may indicate that the signaled bandwidth corresponds to a required bandwidth, whereas the tunnel is to be considered a zero-bandwidth tunnel. Alternatively, the tunnel may be signaled as a zero-bandwidth tunnel, and an additional novel field 540 may be used to relay the desired bandwidth. In other words, the tunnels indicate their desired bandwidths, but are to be admitted as though they were zero-bandwidth tunnels (e.g., by a call admission control module, or "CAC", or by intermediate nodes generally).

Intermediate nodes (e.g., node G) along the path of a signaled tunnel admit the tunnel as they would any other zero-bandwidth tunnel (as will be understood by those skilled in the art), and note the desired bandwidth of the tunnel. Once the new tunnel is admitted, the rerouting process of the intermediate nodes compute a bandwidth scaling factor by which they need to scale the newly requested bandwidth of the new (zero-bandwidth) tunnel (e.g., and possibly the existing tunnel reservations as well) so that all the tunnels may be established with their desired bandwidths (e.g., so all tunnels "fit") on the intermediate nodes' link. (Note that the intermediate nodes may maintain all such zero-bandwidth tunnels for a period of time to allow other zero-bandwidth tunnels to be placed in order to make a more informed determination of a scaling factor.) For example, if a particular link of an intermediate node may support 90 Mbps, but the total reservations and desired reservations total 100 Mbps, then the scaling factor may be configured as 10% (e.g., reducing 100 Mbps by 10%=90 Mbps).

Once the scaling factor is computed for a particular link of an intermediate node (e.g., 10% scaling for link G-F from node G), the intermediate node may inform corresponding head-end nodes (i.e., head-end nodes with tunnels traversing the particular link) of the scaling factor (and/or their actual scaled down bandwidths) in the form of a feedback message. For example, a novel TLV 400 in the LSP-ATTRIBUTE 530 of an RSVP Resv message 500 may be used to carry the scaling feedback information to the head-end nodes accordingly. Each message 500 may contain feedback for a single intermediate node, or may record the feedback for a plurality of intermediate nodes (e.g., for each hop) along the path. Also, the message 500 may contain the "most stringent" (or "worst") feedback/scaling factor (i.e., the highest reduction) for the particular tunnel, e.g., where each updating intermediate node determines whether its scaling factor is more stringent than what is contained within the message, and if so, updates the message to replace the current scaling factor with its own.

Based on the received feedbacks from the intermediate nodes, the rerouting process of a head-end node may determine the most stringent feedback/scaling factor for each of its tunnels, and resignals the tunnels with the new (scaled down) bandwidths along the current paths (e.g., node B resignals T2 with 90% of its desired bandwidth). Optionally, only newly rerouted tunnels (i.e., due to the failure/preemption) need be scaled down, but all previous tunnels may also be scaled down according to one or more embodiments described herein. (For example, old tunnels may be resized using novel RSVP extensions implementing a similar mechanism to those described in RFC 4495, but adapted to an RFC 3209 environment, as will be understood by those skilled in the art.) For instance, tunnel T1 from head-end node A has already been rerouted, thus may be considered a previous/old tunnel. Accordingly, node G may be configured to inform node A to reduce its tunnels traversing link G-F (e.g., tunnel T1) by a scaling factor, which may reduce the scaling factor of tunnel T2 (e.g., scaling both tunnels by 5%, rather than 10% for T2 only).

Notably, there may be occasions where a previously un-rerouted tunnel is resignaled with a bandwidth lower than what an intermediate node has requested based on the scaled bandwidth. In this event, more bandwidth is available to the intermediate node, and another (new) feedback may optionally be sent to the head-end nodes of the other tunnels (i.e., sharing the particular link with more available bandwidth) with a new scaling factor. For example, this may occur where one intermediate node desires a scaling factor of a first amount (e.g., 5% for tunnel T1 at link G-F), but the tunnel is scaled down by a second amount (e.g., 10% for tunnel T1 at link F-I). In particular, this may be the case where each intermediate node sends its own feedback to the head-end nodes. In other words, a first intermediate node indicates a scaling factor of 5%, while another intermediate node (e.g., which shares a subset of the tunnels with the first intermediate node) may request a scaling factor of 10%. (Another example is when a head-end node decides not to reroute a tunnel because it considers the scaling factor to be too high, thus routing the traffic by other means.) Accordingly, the subset of tunnels may be reduced by 10%, allowing for more available bandwidth for the other tunnels of the first intermediate node (e.g., tunnel T2 at node G), since the subset is scaled greater than its fair share amount.

Figure 7:
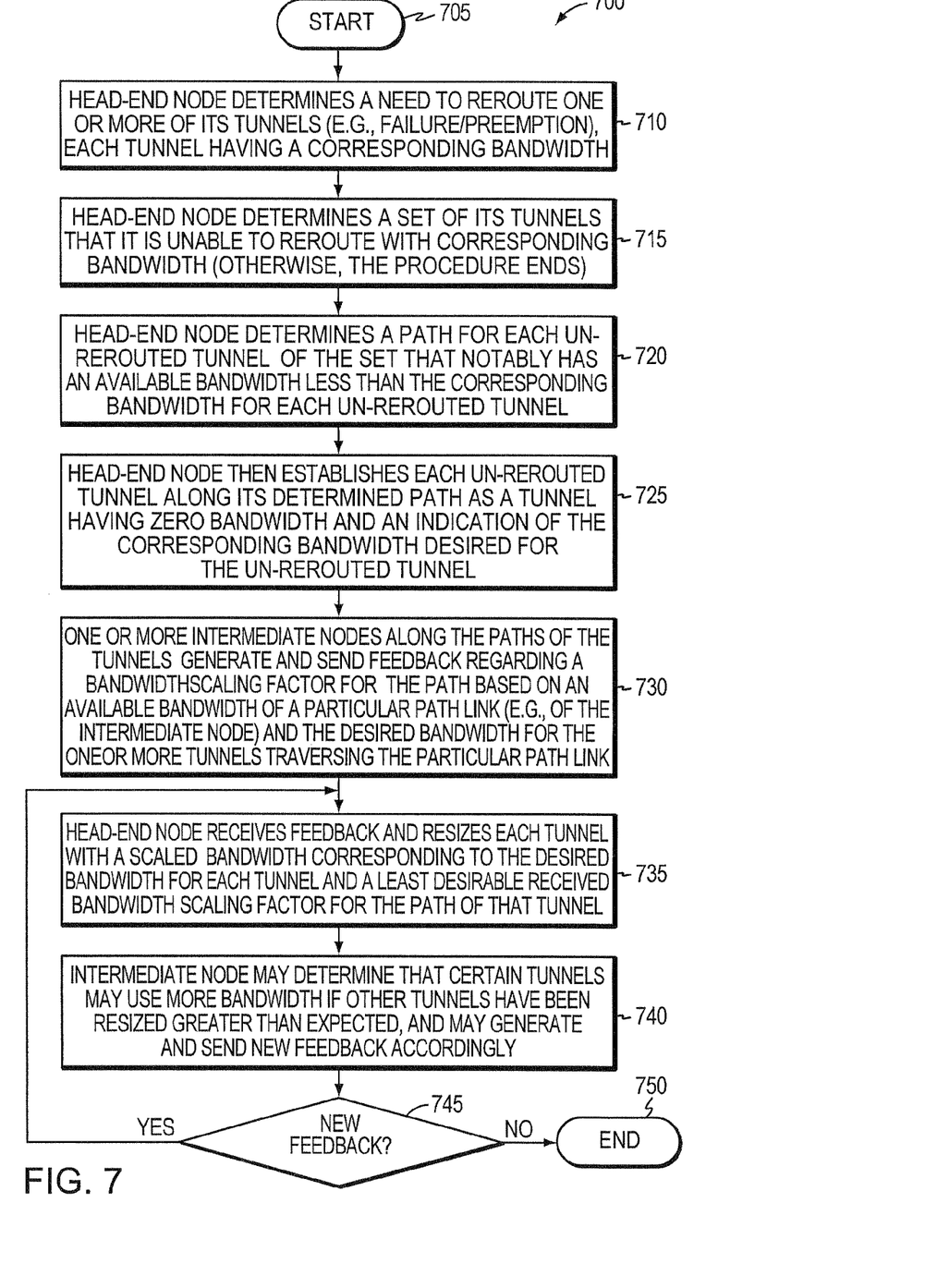
FIG. 7 illustrates an example procedure for optimized distributed tunnel rerouting in accordance with one or more embodiments described herein.

FIG. 7 illustrates an example procedure for optimizing distributed rerouting of tunnels in accordance with one or more embodiments described herein. The procedure 700 starts at step 705, and continues to step 710, where the rerouting process of a head-end node determines a need to reroute one or more of its tunnels (e.g., due to failure or preemption), each tunnel having a corresponding bandwidth. In step 715, the rerouting process of the head-end node determines a set of its tunnels that it is unable to reroute with corresponding bandwidths, that is, by attempting to compute new paths for the tunnels and failing to find a path for one or more tunnels. (If all tunnels may be rerouted, the procedure ends in step 750.)

If a tunnel may not be rerouted, the rerouting process of the head-end node determines/computes a path for each un-rerouted tunnel of the set in step 720. (Notably the computed path has an available bandwidth less than the corresponding bandwidth for each un-rerouted tunnel, as mentioned above.) In step 725, the rerouting process of the head-end node then establishes each un-rerouted tunnel along its determined path as a tunnel having zero bandwidth and an indication of the corresponding bandwidth desired for the un-rerouted tunnel. One or more intermediate nodes along the paths of the tunnels generate and send feedback in step 730 regarding a bandwidth scaling factor for the path based on an available bandwidth of a particular path link (e.g., of the intermediate node) and the desired bandwidth for the one or more tunnels traversing the particular path link, as described above. The rerouting process of the head-end node receives feedback and resizes each tunnel in step 735 with a scaled bandwidth corresponding to the desired bandwidth for each tunnel and a most stringent received bandwidth scaling factor for the path of that tunnel.

As mentioned above, an intermediate node may determine that certain tunnels may use more bandwidth if other tunnels have been resized greater than expected, and may generate and send new feedback accordingly in step 740. If there is new feedback in step 745, then the procedure 700 returns to step 735 where the head-end node receives the feedback and may resize the tunnel(s) accordingly. Otherwise, if no new feedback is generated, the procedure 700 ends in step 750. Further details, modifications, and/or options for procedure 700 are described above.

Advantageously, the novel techniques described herein optimize distributed re-routing of tunnels in a computer network. By having head-end nodes respond to intermediate node feedback, the novel techniques allow each head-end node to locate a path for each of its rerouted tunnels. In particular, the techniques described above allow for bandwidth scaling of the rerouted tunnels based on intermediate node feedback, such that the rerouted tunnels are allowed to reserve a certain amount of bandwidth (although not necessarily their full desired bandwidth). Also, the dynamic aspects of one or more embodiments described herein alleviate the need for cumbersome and inefficient manual configuration.

While there have been shown and described illustrative embodiments that optimize distributed rerouting of tunnels in a computer network, it is to be understood that various other adaptations and modifications may be made within the spirit and scope of the present invention. For example, the embodiments have been shown and described herein relating to various protocol messages and fields, e.g., IGP and/or RSVP and related fields, etc. However, the embodiments of the invention in their broader sense are not so limited, and may, in fact, be used with other messaging/notification protocols or other fields, such as proprietary or application specific protocols, or other fields (e.g., TLVs) within the messages described herein, as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    determining, at a head-end node, a need to reroute one or more tunnels of the head-end node, each tunnel having a corresponding bandwidth;
    determining a set of the one or more tunnels that the head-end node is unable to reroute with corresponding bandwidth(s);
    computing a path for each un-rerouted tunnel of the set, the path having an available bandwidth less than the bandwidth for the corresponding un-rerouted tunnel;
    establishing a tunnel for each un-rerouted tunnel along a corresponding determined path, each established tunnel having zero bandwidth and an indication of the corresponding bandwidth for the un-rerouted tunnel;
    receiving feedback from one or more intermediate nodes along the path of each established tunnel, the feedback regarding a bandwidth scaling factor for the path based on an available bandwidth of a particular path link of the corresponding intermediate node and the desired bandwidth for the tunnels traversing the particular path link; and
    resizing each established tunnel with a scaled bandwidth corresponding to the desired bandwidth for the established tunnel and a most stringent received bandwidth scaling factor for the path of that tunnel.

2. The method as in claim 1, wherein the need to reroute is due to a failure of a particular link.

3. The method as in claim 1, wherein the need to reroute is due to a preemption of tunnels.

4. The method as in claim 1, further comprising:
    performing the step of computing a path for each un-rerouted tunnel of the set in response to determining that conventional path computation is unable to determine a path for each un-rerouted tunnel of the set that has an available bandwidth greater than or equal to the corresponding bandwidth for each un-rerouted tunnel.

5. The method as in claim 1, wherein the step of receiving feedback further comprises:
receiving one or more feedback messages, each corresponding to feedback generated by a single intermediate node.

6. The method as in claim 1, wherein the step of receiving feedback further comprises:
receiving a single feedback message for each tunnel, the feedback message corresponding to feedback generated by each intermediate node along the path of the corresponding tunnel.

7. The method as in claim 6, wherein the single feedback message records each feedback for each intermediate node.

8. The method as in claim 6, wherein the single feedback message records the most stringent feedback of the one or more intermediate nodes along the path.

9. The method as in claim 1, wherein only rerouted tunnels are resized.

10. The method as in claim 1, wherein rerouted tunnels and non-rerouted tunnels of the head-end node are resized.

11. The method as in claim 1, further comprising:
receiving new feedback from one or more intermediate nodes along the path of a particular tunnel, the new feedback regarding a new bandwidth scaling factor for the path based on an available bandwidth of a particular path link of the corresponding intermediate node and actual reserved bandwidth for the resized tunnels traversing the particular path link; and
resizing the particular tunnel with a new scaled bandwidth corresponding to the desired bandwidth for the particular tunnel and a most stringent received new bandwidth scaling factor for the path of that tunnel.

12. A head-end node, comprising:
means for determining a need to reroute one or more tunnels of the head-end node, each tunnel having a corresponding bandwidth;
means for determining a set of the one or more tunnels that the head-end node is unable to reroute with corresponding bandwidth(s);
means for computing a path for each un-rerouted tunnel of the set, the path having an available bandwidth less than the bandwidth for the corresponding un-rerouted tunnel;
means for establishing a tunnel for each un-rerouted tunnel along a corresponding determined path, each established tunnel having zero bandwidth and an indication of the corresponding bandwidth for the un-rerouted tunnel;
means for receiving feedback from one or more intermediate nodes along the path of each established tunnel, the feedback regarding a bandwidth scaling factor for the path based on an available bandwidth of a particular path link of the corresponding intermediate node and the desired bandwidth for the tunnels traversing the particular path link; and
means for resizing each established tunnel with a scaled bandwidth corresponding to the desired bandwidth for the established tunnel and a most stringent received bandwidth scaling factor for the path of that tunnel.

13. A head-end node, comprising:
one or more network interfaces adapted to communicate with one or more intermediate nodes and to carry one or more tunnels of the head-end node;
one or more processors coupled to the network interfaces and adapted to execute one or more processes; and
a memory adapted to store a rerouting process executable by each processor, the rerouting process when executed operable to: i) determine a need to reroute one or more tunnels of the head-end node, each tunnel having a corresponding bandwidth, ii) determine a set of the one or more tunnels that the head-end node is unable to reroute with corresponding bandwidth(s), iii) compute a path for each un-rerouted tunnel of the set, the path having an available bandwidth less than the bandwidth for the corresponding un-rerouted tunnel, iv) establish a tunnel for each un-rerouted tunnel along a corresponding determined path, each established tunnel having zero bandwidth and an indication of the corresponding bandwidth for the un-rerouted tunnel, v) receive feedback from one or more intermediate nodes along the path of each established tunnel, the feedback regarding a bandwidth scaling factor for the path based on an available bandwidth of a particular path link of the corresponding intermediate node and the desired bandwidth for the tunnels traversing the particular path link, and vi) resize each established tunnel with a scaled bandwidth corresponding to the desired bandwidth for the established tunnel and a most stringent received bandwidth scaling factor for the path of that tunnel.

14. The head-end node as in claim 13, wherein the need to reroute is due to a failure of a particular link.

15. The head-end node as in claim 13, wherein the need to reroute is due to a preemption of tunnels.

16. The head-end node as in claim 13, wherein the rerouting process is further operable to:
compute a path for each un-rerouted tunnel of the set, the path having an available bandwidth less than the bandwidth for the corresponding un-rerouted tunnel in response to determining that conventional path computation is unable to determine a path for each un-rerouted tunnel of the set that has an available bandwidth greater than or equal to the corresponding bandwidth for each un-rerouted tunnel.

17. The head-end node as in claim 13, wherein the rerouting process is further operable to:
receive one or more feedback messages, each corresponding to feedback generated by a single intermediate node.

18. The head-end node as in claim 13, wherein the rerouting process is further operable to:
receive a single feedback message for each tunnel, the feedback message corresponding to feedback generated by each intermediate node along the path of the corresponding tunnel.

19. The head-end node as in claim 13, wherein resized tunnels are selected from the group consisting of: only rerouted tunnels, and rerouted and non-rerouted tunnels.

20. The head-end node as in claim 13, wherein the rerouting process is further operable to:
receive new feedback from one or more intermediate nodes along the path of a particular tunnel, the new feedback regarding a new bandwidth scaling factor for the path based on an available bandwidth of a particular path link of the corresponding intermediate node and actual reserved bandwidth for the resized tunnels traversing the particular path link; and
resize the particular tunnel with a new scaled bandwidth corresponding to the desired bandwidth for the particular tunnel and a most stringent received new bandwidth scaling factor for the path of that tunnel.

* * * * *